United States Patent [19]
Perlman et al.

[11] 3,873,906

[45] Mar. 25, 1975

[54] SIGNAL CONVERSION CIRCUITS

[75] Inventors: Stuart Stanley Perlman; Joseph Henry McCusker, both of Princeton, N.J.

[73] Assignee: RCA Corporation, New York, N.Y.

[22] Filed: Oct. 29, 1973

[21] Appl. No.: 410,770

[52] U.S. Cl. .................... 323/19, 307/252 B, 320/1, 321/16, 323/24, 323/34, 323/36

[51] Int. Cl. .............................................. G05f 3/08

[58] Field of Search ....... 307/252 B, 252 N; 323/19, 323/21, 24, 34, 36; 320/1; 321/16, 18

[56] References Cited

UNITED STATES PATENTS

| | | | |
|---|---|---|---|
| 3,360,713 | 12/1967 | Howell | 323/21 UX |
| 3,456,133 | 7/1969 | Warren | 323/24 X |
| 3,475,676 | 10/1969 | Hutson | 323/21 |
| 3,493,783 | 2/1970 | Till | 307/252 B |
| 3,590,365 | 6/1971 | Nelson | 323/19 |
| 3,740,582 | 6/1973 | McCusker et al. | 323/34 X |
| 3,763,381 | 10/1973 | Cromwell et al. | 307/252 B |
| 3,777,188 | 12/1973 | Mazur | 323/21 X |

*Primary Examiner*—A. D. Pellinen
*Attorney, Agent, or Firm*—H. Christoffersen; S. Cohen

[57] ABSTRACT

The conduction path of a thyristor and a capacitor are connected in series between two terminals for alternating current power. A circuit responsive to a control signal manifestation and to a phase shifted version of the alternating current may be employed to trigger the thyristor once each period of the alternating current at a time to charge the capacitor in one sense or the other, as desired, and to a desired level.

13 Claims, 4 Drawing Figures

SIGNAL CONVERSION CIRCUITS

This invention relates to signal conversion circuits and particularly to circuits for converting an AC input signal to a desired output signal.

Prior art signal conversion techniques customarily employ specialized circuits for producing different kinds of output signals. For example, a circuit comprising a rectifier and a filter is customarily employed to translate an AC input signal to a positive or negative DC output signal. Relatively complex series or shunt regulators, variable transformers or switching regulators are used to control the value of the DC output signal. Even more complex circuitry such as linear amplifiers are usually employed if it is desired that the DC output signal be capable of ranging over both positive and negative values.

A need exists for a relatively simple signal conversion circuit for performing the functions discussed above. The present invention is directed to meeting this need.

A circuit in accordance with an embodiment of the present invention includes a switch and a capacitor connected in series between two terminals receptive of an alternating current signal. Means including a phase shift circuit responsive to the alternating current signal and to a control signal closes and opens the switch once each period of the alternating current at a time and for a period to cause current flow into the capacitor either in one direction or the other, as desired. So operated, a charge becomes stored in the capacitor of a polarity and magnitude dependent upon the time at which the switch is closed relative to the value of the alternating current signal.

Figure 1:
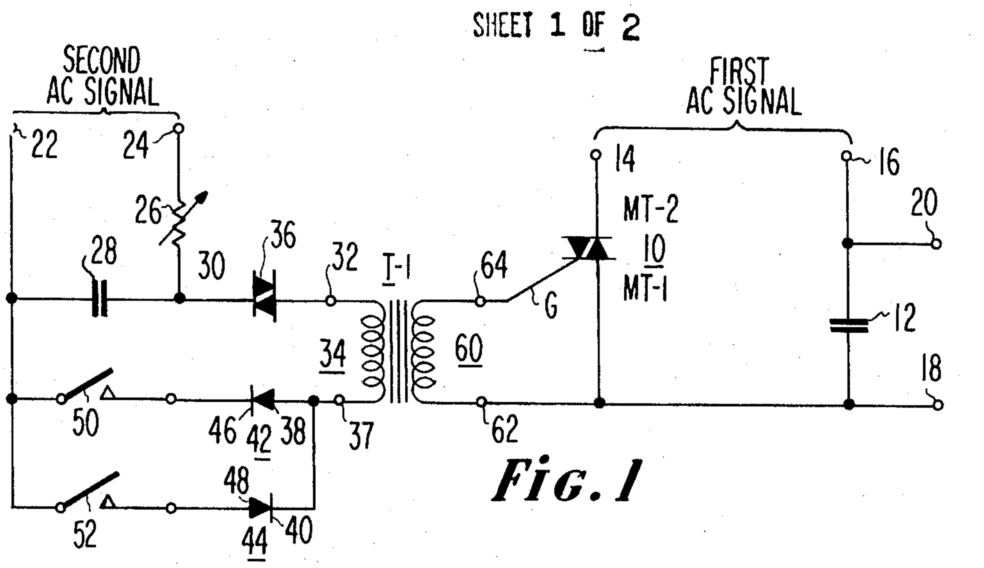
Figure 2:
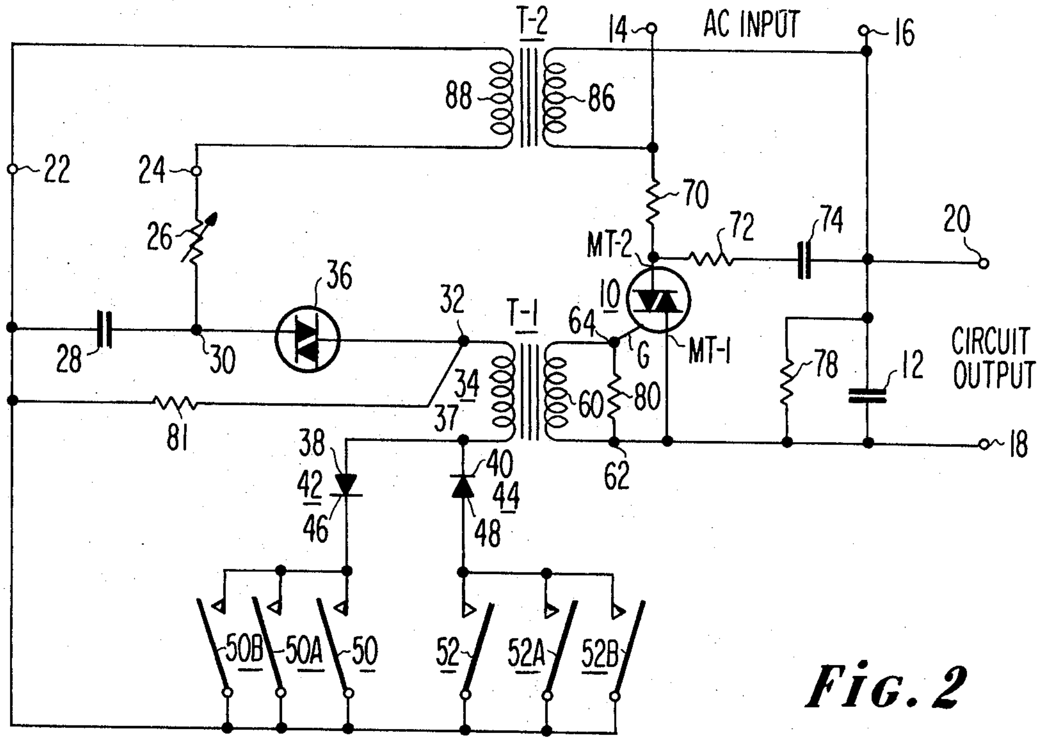
Figure 3:
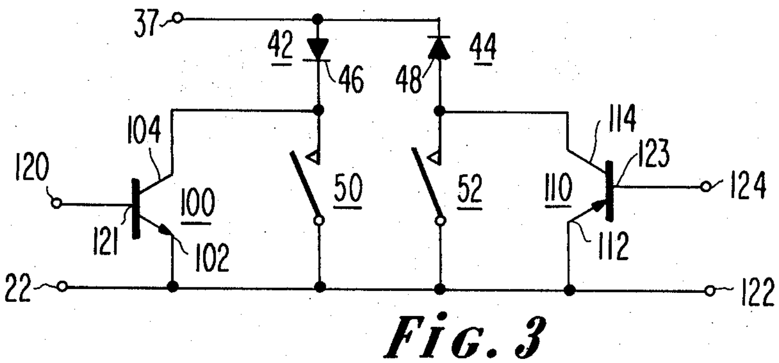
Figure 4:
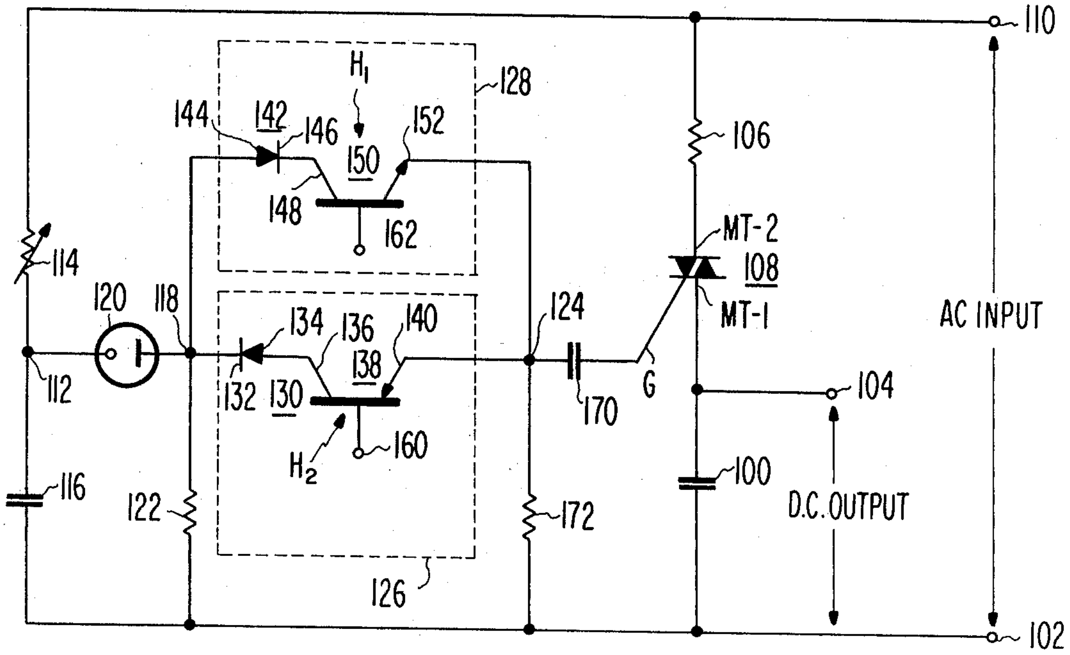

The invention is illustrated in the accompanying drawings, of which:

FIGS. 1, 2 and 4 are circuit diagrams of embodiments of the invention; and FIG. 3 illustrates an alternative switching circuit for use in the embodiments of FIGS. 1 and 2.

In the circuit of FIG. 1 electronically controllable switch 10 and capacitor 12 are connected essentially in series between AC input terminals 14 and 16. The switch comprises a triac having a main terminal MT-2 connected to terminal 14 and a main terminal MT-1 connected to one plate of capacitor 12 at output terminal 18. The other plate of capacitor 12 is connected to AC input terminal 16 and output reference terminal 20.

Before describing the remaining elements of FIG. 1, it is helpful to first consider in detail the operation of capacitor 12 and triac 10. In the present invention, capacitor 12 serves the function of storing charge delivered to it when triac 10 is conductive. The voltage across capacitor 12, available between output terminals 18 and 22, is a function of the amount of charge stored therein. The sense and magnitude of this voltage is a function (in part) of the time at which triac 10 is triggered relative to the AC input signal. Other factors affecting the output voltage include the capacity of capacitor 12, the nature of the load, if any, connected to output terminals 18 and 20, and in particular, the switching characteristics of triac 10.

In the example that follows, assume that terminals 16 and 20 are maintained at ground reference potential and that an AC signal from a low impedance source is supplied to terminal 14. Assume that the time constant associated with the source impedance and capacitor 12 is much less than the period of the AC input signal. (This assumption materially affects the circuit operation, a different assumption may be made with regard to FIG. 2).

If triac 10 is triggered on at a time when the AC voltage at terminal 14 is more positive than the capacitor voltage at terminal 18 a charging current will flow from terminal 14 through the triac and into capacitor 12. This current will continue to flow until its value becomes less than the minimum "holding current" value for the particular triac selected. The holding current is that minimum value of current necessary to sustain a triac in a conductive condition once triggered on.

Conversely, if triac 10 is triggered at a time that the AC voltage at terminal 14 is less positive than the capacitor voltage at terminal 18, the charging current will flow in the opposite direction, i.e., from capacitor 12 to terminal 14. As in the previous case, this current will continue to flow until its value becomes less than the triac minimum holding current value.

It is apparent from the foregoing that a number of possible waveforms can be produced at output terminal 18, depending upon the previously mentioned factors. For example, if triac 10 is triggered only at the positive peak of the AC input signal, capacitor 12 will be charged to the positive peak voltage applied to terminal 14. If, on the other hand, triac 10 is triggered only at the negative peak of the AC input signal, capacitor 12 will be charged to the negative peak value. If triac 10 is triggered at both the positive and negative peaks of the AC input signal, capacitor 12 will be alternately charged to the positive and negative peak values of the AC input signal. Since it was previously assumed with regard to the embodiment of FIG. 1, that the charging time constant is short compared with the period of the AC input signal, the capacitor voltage in this last case will be substantially a square wave having a peak-to-peak value equal to that of the AC input signal. Other output voltage waveforms may be obtained by employing a charging time constant which is long compared to the period of the AC input signal or by triggering triac 10 at other than the peaks of the input signal or both, as will be subsequently explained.

Turning now to the remainder of FIG. 1, triac 10 is provided with gate trigger pulses of controlled phase and polarity relative to a first AC signal applied to AC input terminals 14 and 16. A second pair of AC input terminals 22 and 24, are provided for receiving a second AC input signal having a fixed phase relationship to the first AC signal. A phase shifter including series connected variable resistor 26 and capacitor 28 is coupled between terminals 24 and 22. The phase shifter output terminal 30 is coupled to terminal 32 of primary winding 34 of transformer T-1 by the conduction path of diac 36. It will be appreciated that other suitable bilateral threshold conduction devices may be employed in lieu of diac 36 such as a neon lamp or a silicon bilateral switch. The other terminal 37 of primary winding 34 is coupled to anode 38 and cathode 40 of diodes 42 and 44, respectively. Cathode 46 and anode 48 of diodes 42 and 44, respectively, are coupled to AC input terminal 22 by switches 50 and 52, respectively. Secondary winding 60 of transformer T-1 is connected at its terminals 62 and 64 to main terminal MT-1 and gate G of triac 10, respectively.

Variable resistor 26 and capacitor 28 form a phase shift network to produce an output signal having a desired phase relative to the second AC signal which is of a fixed phase relative to the first AC signal. Diac 36 produces output pulses when either of switches 50 or 52 is closed and the phase shifted signal reaches the diac threshold voltage. The threshold characteristic of diac 36 also provides an effective additional phase shift over that afforded by resistor 26 and capacitor 28. This additional phase shift results because the voltage threshold of the diac is necessarily reached at a time later than a given phase shifted axis crossing of the AC input signal. Switches 50 and 52, and diodes 42 and 44 select which of the pulses produced by the phase shift circuit and diac are supplied to primary winding 34 of transformer T-1. Transformer T-1, which may be a pulse transformer, provides AC coupling and DC isolation of the trigger pulses from the triac gate.

For the purpose of the following explanation, assume that terminals 16, 20 and 22 are grounded and that a common AC input signal is applied to terminals 14 and 24. Assume also that capacitor 12 is initially uncharged and that switches 50 and 52 are open as shown in the Figure. Under these assumptions, the voltage at terminal 30 will lag at a phase between 0 and 90 electrical degrees relative to the common AC input signal. The phase and magnitude of this voltage is determined by the values of resistor 26 and capacitor 28 and the period of the AC input signal. Since switches 50 and 52 are open, there will be no primary current flow in transformer T-1, hence, no trigger pulses will be supplied to triac 10 and capacitor 12 will remain uncharged. Thus, there will be no output voltage produced at output terminal 18.

Upon closure of switch 50, diac 36 becomes conductive when the voltage at circuit point 30 is of a positive value and in excess of the diac positive threshold voltage. A current pulse due to a partial discharge of capacitor 28 during each positive half cycle of the AC input signal thus flows from circuit point 30 through diac 36, transformer primary winding 34, diode 42 and switch 50 to AC input terminal 22. The current flow in primary winding 34 induces a current flow in secondary winding 60 which triggers triac 10 once each period of the AC signal to conduct a charging current to capacitor 12. The direction of the flow of the charging current depends upon the relative values of the AC input signal at terminal 14 and the potential at terminal 18 at the moment triac 10 is triggered. For example, if triac 10 is triggered when the AC signal is at a positive maximum capacitor 12 will be charged substantially to the positive peak value of the AC input signal with a time constant determined primarily by the value of capacitor 12 and the impedance of the source supplying the AC input signal.

If, on the other hand, switch 52 is closed (switch 50 open), diac 36 will become conductive when the voltage at circuit point 30 is of a negative value and in excess of the diac negative threshold voltage. This will cause a current to flow from AC input terminal 22 through switch 52, diode 44 primary winding 34 and diac 36 to circuit point 30. The current flow in primary winding 34 induces a current flow in secondary winding 60 which triggers triac 10 once each period of the AC signal to conduct a charging current to capacitor 12. For example, if triac 10 is triggered when the AC signal is at a negative maximum capacitor 12 will be charged substantially to the negative peak value of the AC input signal (assuming, again, that the time constant formed by capacitor 12 and the impedance of the source supplying the AC signal is relatively short compared to the period of the AC signal).

It is thus seen that triac 10 charges capacitor 12 to a peak value of the AC input signal when triggered into conduction by closing an appropriate one of the switches. If a lesser voltage is desired, in the embodiment of FIG. 1, it is necessary to trigger triac 10 into conduction at some time later than the peak of the AC signal by varying the phase of the trigger signal. In the alternative, as will be explained with regard to the circuit of FIG. 2, capacitor 12 may be arranged to charge more slowly. Circuit operation of FIG. 2 will be seen to be substantially the same as in FIG. 1 in the sense that the output signal polarity is determined by closing a selected one of the switches while the output signal magnitude is determined in accordance with the phase shift. The slower charging rate greatly reduces the magnitude of the peak charging current into capacitor 12 thus reducing the peak current handling requirements for triac 10.

The circuit of FIG. 2 additionally includes a current limiting resistor 70 connected between input terminal 14 and main terminal T2 of triac 10. A snubber network including series connected resistor 72 and capacitor 74 is coupled between main terminal T2 and output terminal 20. Additional switches 50A and 50B are connected in paralel across switch 50 and additional switches 52A and 52B are connected in parallel across switch 52. Additional resistor 78 is connected in parallel across capacitor 12, and a further resistor 80 is connected across secondary winding 60 of transformer T1 and another resistor 81 is connected from the primary terminal 32 of transformer T-1 to the AC input terminal 22. FIG. 2 also includes transformer T2 having its primary winding 86 coupled across AC input terminals 14 and 16 and its secondary winding 88 coupled to input terminals 22 and 24.

Operation of the circuit of FIG. 2 is substantially the same as that of FIG. 1. The additional switches 50A, 50B, 52A, 52B serve to illustrate that a plurality of switches may be employed to control triggering of thyristor 10. Since the switches controlling diodes 42 and 44 are all parallel connected, it is apparent that a three wire control system may be employed to connect the various switches at a number of different locations physically separate from the actual location of the controlled thyristor.

The addition of transformer T2 to the circuit provides an AC voltage to terminals 22 and 24 of a fixed phase relative to the AC voltage applied to terminals 14 and 16, and illustrates two features of the present invention. The first, is that the switching and control circuit may be direct current isolated from the controlled thyristor, i.e., the combined effect of transformers T1 and T2 is to provide direct current isolation of terminals 22 and 24 from terminals 14 and 16. The second feature of transformer T2 is that its secondary winding 88 may be employed to produce a much lower voltage than that applied to primary winding 86 since the voltage required to trigger thyristor 10 is a relatively small voltage compared to the voltage that triac 10 is typically capable of switching. Therefore, switches such as 50 and 52 may be operated at relatively low potentials. This is a further advantage with regard to the additional switches 50A, 50B, 52A and 52B when they are at remote locations because the interconnecting three wire transmission line may comprise relatively inexpensive low voltage wiring.

Added resistor 78 is employed to discharge capacitor 10 when AC power is removed from input terminals 14 and 16. Added resistor 80 across the secondary of transformer T1 has been introduced to provide damping of transformer T1 where, for example, a pulse transformer is employed and provides a relatively fixed load at secondary winding 60. Snubber network, including resistor 72 and capacitor 74 is provided for limiting the transient rate of rise of voltage across triac 10. Such a network may or may not be needed depending upon the voltage applied to input terminals 14 and 16 and the particular thyristor employed.

Resistor 70 tends to limit the charging current into capacitor 12 when triac 10 is conductive thus reducing the peak current handling requirement of the triac. Where the impedance of the AC source is, in itself, adequate to limit the surge current through triac 10 this resistor may be omitted. In the alternative, by making the value of this resistor relatively large such that the time constant formed by resistor 70 and capacitor 12 is long compared to the period of the AC input signal capacitor 12 and resistor 70 will act as a low pass filter producing an output voltage representative of the average of the current conducted by triac 10. The low pass filtering action may be used to advantage in applications where it is desired that the harmonic content of the DC output voltage be relatively low.

Resistor 81 is not essential to operation of the present circuit but its inclusion has been found helpful in providing uniform trigger pulses by providing a relatively small continuous load at circuit point 32.

In operation, an AC signal applied to terminals 14 and 16 is transformed into a lower voltage at secondary 88 of transformer T2 and applied to resistor 26 and capacitor 28, which produces a low voltage phase shifted signal. The low voltage phase shifted signal is conducted through diac 36 and primary 34 of transformer T1 as selected by switches 52, 52A, 52B, 50, 50A or 50B. Transformer T1 may be phased so that the pulse selected is of the same relative polarity as the potential across terminals T1 and T2 of triac 10 so that triac 10 can function in its more sensitive triggering modes ($I^+$, $III^-$). If the switch position is such that trigger pulses are applied to triac 10 only during the positive cycle of the AC input signal, capacitor 12 will be charged through resistor 70 to produce a positive output potential at terminal 18. Conversely, if the pulse applied to triac 10 is selected to be those occurring only during the negative cycle of the AC input signal, capacitor 12 will receive a negative charging current through resistor 70. Since the combined effect of resistor 70 and capacitor 12 is to slow the charging current provided by triac 10, the output voltage at terminal 18 can be made to be a function of its previous charge, which switch was closed and the phase shift provided by resistor 26 and capacitor 28. Closing selected ones of the switches thus allows control of the polarity of the voltage produced at output terminal 18 while adjustment of resistor 26 controls the magnitude of that voltage.

FIG. 3 illustrates how transistor switches or mechanical switches may be employed to provide the switching function of FIGS. 1 and 2. In FIG. 3 NPN transistor 100 is connected in parallel with switch 50. Emitter 102 is coupled to terminal 22 and collector 104 is coupled to cathode 46 of diode 42. PNP transistor 110 is connected in parallel with switch 52 and has its emitter 112 coupled to terminal 22 and its collector 114 coupled to anode 48 of diode 44. Control terminal 120 is coupled to base 121 of NPN transistor 100. Control terminal 122 is coupled to terminal 22, and control terminal 124 is coupled to base 123 of PNP transistor 110.

In operation, a positive potential applied to terminal 120 relative to terminal 122 turns NPN transistor 100 on allowing unilateral conduction from terminal 37 through diode 42 to terminal 22. This is the same function which could be accomplished by closing switch 50. Conversely, application of a negative potential at terminal 124 relative to terminal 122 turns transistor 110 on thereby allowing unilateral conduction of current from terminal 22 through transistor 110 and diode 44 to terminal 37. This is the same action that would be accomplished by closing switch 52. Operation of the circuits of FIGS. 1 and 2 therefore, may be controlled either by mechanical means (such as relays or switches) or by electronic means as shown in FIG. 3 or by combination of both.

Various other modifications may be made to embodiments of FIGS. 1 and 2. For example, capacitor 12 has been shown connected between main terminal T-1 of triac 10 and AC input terminal 16. Capacitor 12 can, in the alternative, be connected between main terminal T-2 and input terminal 14 due to the simple series relationship between the capacitor and triac. Also, means other than a transformer may be employed to couple the selected pulses to gate G of triac 10. For example, FIG. 4 and the discussion which follows illustrates a capacitor coupling technique which eliminates the need for a coupling transformer. Numerous variations of the diode-switch arrangements shown in FIGS. 1–3 are possible. For example, instead of the series connection shown it may be desired to connect the diode-switch arrangement in shunt across capacitor 28 or, in the alternative, in series with resistor 26.

In FIG. 4 trigger pulses are provided to the thyristor by means of capacitor coupling rather than the transformer coupling techniques previously discussed. The circuit of FIG. 4 is capable of complete DC isolation of the control signals from the AC input and DC output signals by employing relays, photo-transistors or the like as switching elements in the pulse forming section of the circuit. Of course, relay, optoelectric or similar isolation techniques may also be used in the previously described transformer coupled circuits if desired.

In detail, output capacitor 100 is connected between terminals 102 and 104 for providing a DC output signal representative of charge stored in the output capacitor. Surge circuit limiting resistor 106 and thyristor 108 are connected in series between terminals 104 and 110 for providing a charging current to output capacitor 100 representative of an AC input signal applied to terminals 102 and 110 when thyristor 108 is conductive. Circuit point 112 is connected to terminals 110 and 102 by variable resistor 114 and phase shift capacitor 116, respectively. Circuit point 112 is further connected to circuit point 118 by means of a bilateral threshold conduction device shown as neon lamp 120. This coupling may be accomplished by other suitable bilateral threshold conduction devices such as a diac, a semiconductor bilateral switch (SBS) or the like. Circuit point 118 is coupled to terminal 102 by resistor 122 and to circuit point 124 by means of two parallel connected oppositely poled unilaterally conductive switches 126 and 128. Switch 126 comprises diode 130 having its cathode 132 connected to circuit point 118 and its anode 134 connected to collector 136 of PNP transistor 138 the emitter 140 of which is connected to circuit point 124. Switch 128 comprises diode 142 having its anode 144 connected to circuit point 118 and its cathode 146 connected to collector 148 of NPN transistor 150 the emitter 152 of which is connected to circuit point 124. Transistors 138 and 150 may be responsive to electrical signals supplied to their respective base terminals, 169 and 162, or, in the alternative they may be phototransistors being responsive, respectively, to suitable forms of radiation $H_1$ and $H_2$ applied to their base regions as indicated. As will be explained subsequently, the radiation may be provided by suitable devices such as lamps, light emitting diodes or the like. Circuit point 124 is coupled to gate terminal G of thyristor 108 by means of coupling capacitor 170 and to terminal 102 by means of resistor 172.

Operation of the circuit of FIG. 4 is substantially the same as that of the previously discussed circuits. Application of an AC signal to terminals 110 and 102 causes a charging current to flow through variable resistor 114 which charges phase shift capacitor 116 to produce a phase shifted AC signal at circuit point 112. When the value of the phase shifted AC signal exceeds either the positive or negative threshold level of the threshold conduction device (neon lamp 120) the threshold conduction device conducts to discharge capacitor 116 through resistor 122 producing a phase shifted voltage pulse at circuit point 118. Resistor 122 is not essential to operation of the present circuit but its inclusion has been found helpful in providing uniform trigger pulses by providing a relatively small continuous load at circuit point 118.

Taking positive axis crossings of the AC input signal as a reference, the value of resistor 114 may be adjusted, as an example, such that the positive and negative pulses at circuit point 118 occur at phase angles of $-90°$ and $-270°$, respectively. If switches 126 and 128 are open the alternating polarity phase shifted pulses at circuit point 118 are prevented from reaching circuit point 124 and being conducted to the gate G of thyristor 108. The thyristor thus remains nonconductive and the charge on capacitor 100, if any, remains constant (assuming negligible load current flow between terminals 104 and 102).

If switch 126 is closed the negative pulses which occur at $-270°$ (as assumed) are conducted to the gate of thyristor 108 triggering it to conduct a negative charging current to capacitor 100. Since a trigger pulse occuring at $-270°$ occurs at the negative maximum of the AC input signal capacitor 100 will be charged substantially to the negative peak value of the AC input signal with the peak charging current limited by surge current limiting resistor 106. Resistor 106 may be omitted in applications where the inherent source impedance of the AC signal source is in itself adequate to provide sufficient surge current limiting to protect thyristor 108 from excessive currents. Resistor 172 provides a discharge path for coupling capacitor 170.

Closure of switch 128 conducts positive trigger pulses to trigger thyristor 108 at 90° relative to the AC input signal which charges capacitor 100 to the positive maximum value of the AC signal. In either case (switch 126 or switch 128 closed) lesser values of output voltage may be obtained by varying the phase of the phase shifted trigger signals as previously explained with regard to FIGS. 1 and 2.

Switches 126 and 128 in FIG. 4 are shown to each comprise a series connected transistor and diode. The transistors are complementary and the diodes are oppositely poled so that the switches are unilaterally conductive to opposite polarity trigger signals. The transistors may be either conventionally controlled by application of control currents to their base terminals or, in the alternative, they may be photo-transistors controlled by radiation, H, applied to their base regions. The radiation may be provided, for example, by lamps or light emitting diodes or other suitable sources. Of course, as in the previous circuits, the transistors may be replaced by (or connected in parallel with) other suitable switches such as relays or manually operated mechanical switches.

What is claimed is:

1. In combination:

two input terminals for receiving an alternating current input signal;

a bidirectional switch;

a load capacitor in series with the switch, the series circuit being connected between said input terminals;

means including a phase shift circuit responsive to a first control signal manifestation for closing said bidirectional switch solely once each period of the alternating current input signal at a time to charge the capacitor in one sense and to a level dependent upon the amount of phase shift introduced by said phase shift circuit, said means being responsive to a second control signal manifestation for closing said bidirectional switch solely once each period of said alternating current input signal at a time to charge said capacitor in the opposite sense and to a level also dependent upon the phase shift introduced by said phase shift circuit thereby providing a direct current output signal of either polarity and of controllable level across said capacitor.

2. The combination recited in claim 1 wherein said switch comprises a bidirectional triode thyristor having a conduction path and a gate terminal, said conduction path being connected in series with said load capacitor, said gate terminal for receiving a trigger signal.

3. The combination recited in claim 2 wherein said means including a phase shift circuit comprises:

means for applying said alternating current signal to said phase shift circuit for producing a phase shifted alternating current output signal;

two output terminals for receiving said phase shifted output signal;

a circuit path connected between said two output terminals for conducting a path current therebetween;

threshold conduction means in series with said circuit path for enabling conduction of said path current when the potential across said threshold conduction means is greater than a threshold value of either polarity;

further means in series with said circuit path, said further means being responsive to a third control signal manifestation for opening the path and being responsive to said first and second control signal manifestations for both closing the path and limiting the flow of current therethrough to a selected one of two directions; and means for deriving said trigger signal from said circuit path current and applying said trigger signal to said gate terminal of said bidirectional thyristor to charge said capacitor in a selected sense and to a selected level.

4. The combination recited in claim 3 wherein said further means comprises:

means for connecting at least two parallel connected oppositely poled unilaterally conductive switches in series with said path for controlling the direction of flow of said path current in accordance with the conductive state of said switches.

5. The combination recited in claim 3 wherein said further means comprises:

at least two parallel connected oppositely poled diodes, said parallel connected diodes being connected in series with said circuit path, and terminal means for connecting at least one separate switch in series with each of the parallel connected diodes thereby controlling the sense of said path current in accordance with the conductive state of said separate switches.

6. The combination recited in claim 3 wherein said means for deriving a trigger signal from said circuit path current comprises:

a coupling transformer having two windings, one winding being connected in series with said circuit path, the other winding being connected between said gate terminal and one end of said conduction path of said thyristor.

7. The combination recited in claim 3 wherein said means for deriving a trigger signal from said circuit path comprises:

a coupling capacitor connected between a point in said further means and said gate terminal of said thyristor; and a resistor connected between said point and one of said two output terminals.

8. The combination recited in claim 3 further comprising:

a current limiting resistor connected in series with said conduction path of said thyristor for limiting the charging rate of said load capacitor when said thyristor is conductive.

9. A circuit for producing a direct voltage level of either polarity and of controllable magnitude from an alternating current input signal, comprising:

two circuit input terminals for receiving said alternating current input signal;

a bidirectional triode thyristor having first and second main terminals and a gate terminal, said second main terminal being connected to one of said circuit input terminals;

a load capacitor for producing said direct voltage level of either polarity thereacross, said load capacitor being connected between said first main terminal and the other of said circuit input terminals;

circuit means for controlling the magnitude of said direct voltage level of either polarity appearing across said load capacitor, said circuit means being coupled across said input terminals and producing alternating polarity phase shifted trigger pulses in response to said alternating current input signal; and control means for controlling the polarity of said direct voltage level appearing across said load capacitor, said control means being receptive of said alternating polarity phase shifted trigger pulses and connected to said gate terminal, said control means being responsive to a first control signal for applying solely the positive ones of said trigger pulses to said gate terminal and responsive to a second control signal for applying solely the negative ones of said trigger pulses to said gate terminal.

10. The circuit recited in claim 9 further comprising a coupling capacitor connected to said gate terminal, a circuit point in said circuit means for providing said alternating polarity phase shifted trigger pulses and wherein said control means comprises first and second parallel connected oppositely poled unilaterally conductive switches, each being responsive to separate ones of said first and second control signals, said parallel connected switches being connected between said circuit point and said coupling capacitor.

11. The circuit recited in claim 10 wherein said first and second switches are transistor switches.

12. The circuit recited in claim 9 further comprising a current limiting resistor connected in series with said thyristor.

13. The circuit recited in claim 9 further comprising means for adjusting the phase of said trigger pulses relative to said alternating current input signal.

* * * * *